United States Patent [19]

MacDonald

[11] 4,429,712

[45] Feb. 7, 1984

[54] FAUCET

[75] Inventor: Robert D. MacDonald, Mesa, Ariz.

[73] Assignee: Masco Corporation, Taylor, Mich.

[21] Appl. No.: 243,090

[22] Filed: Mar. 12, 1981

[51] Int. Cl.³ .............................................. F16K 19/00
[52] U.S. Cl. ..................................... 137/606; 251/331
[58] Field of Search ............................. 137/606, 625.4; 251/298, 331, DIG. 3

[56] References Cited

U.S. PATENT DOCUMENTS

| | | | |
|---|---|---|---|
| 1,990,635 | 2/1935 | Buttner | 251/331 X |
| 2,752,948 | 7/1956 | St. Clair | 137/625.4 |
| 2,976,887 | 3/1961 | Wilson | 137/625.4 |
| 3,425,446 | 2/1969 | McNown | 251/331 X |
| 3,464,446 | 9/1969 | Jaffier | 137/606 |
| 3,512,547 | 5/1970 | Gibbs | 137/625.4 X |
| 3,561,480 | 2/1971 | Fairchild | 137/625.4 |
| 3,693,660 | 9/1972 | Wheelock | 137/625.4 |
| 3,809,124 | 5/1974 | Nelson | 251/331 X |

FOREIGN PATENT DOCUMENTS 511989  1/1921  France ............................ 137/625.4

Primary Examiner—Robert G. Nilson
Attorney, Agent, or Firm—E. Dennis O'Connor; Steven L. Permut; Leon E. Redman

[57] ABSTRACT

A faucet for controlling the rate of discharge of a fluid under pressure. The faucet has a housing having a passageway therethrough with an inlet port coupled to a fluid supply line. The passageway further has an outlet port open to the ambient atmosphere. A valve seat is formed intermediate the inlet port and the outlet port. A slideway is provided in the housing adjacent to the seat. A flat cantilever spring has one of its ends secured to said housing, the other of its ends overlying said seat, and its intermediate portion disposed within the slideway. A movable element is disposed within the slideway and engages one surface of the spring. The movable element is selectively movable within the slideway along the surface of the spring to regulate the rate of discharge of fluid by varying the distance between the end of the spring and the seat.

4 Claims, 17 Drawing Figures

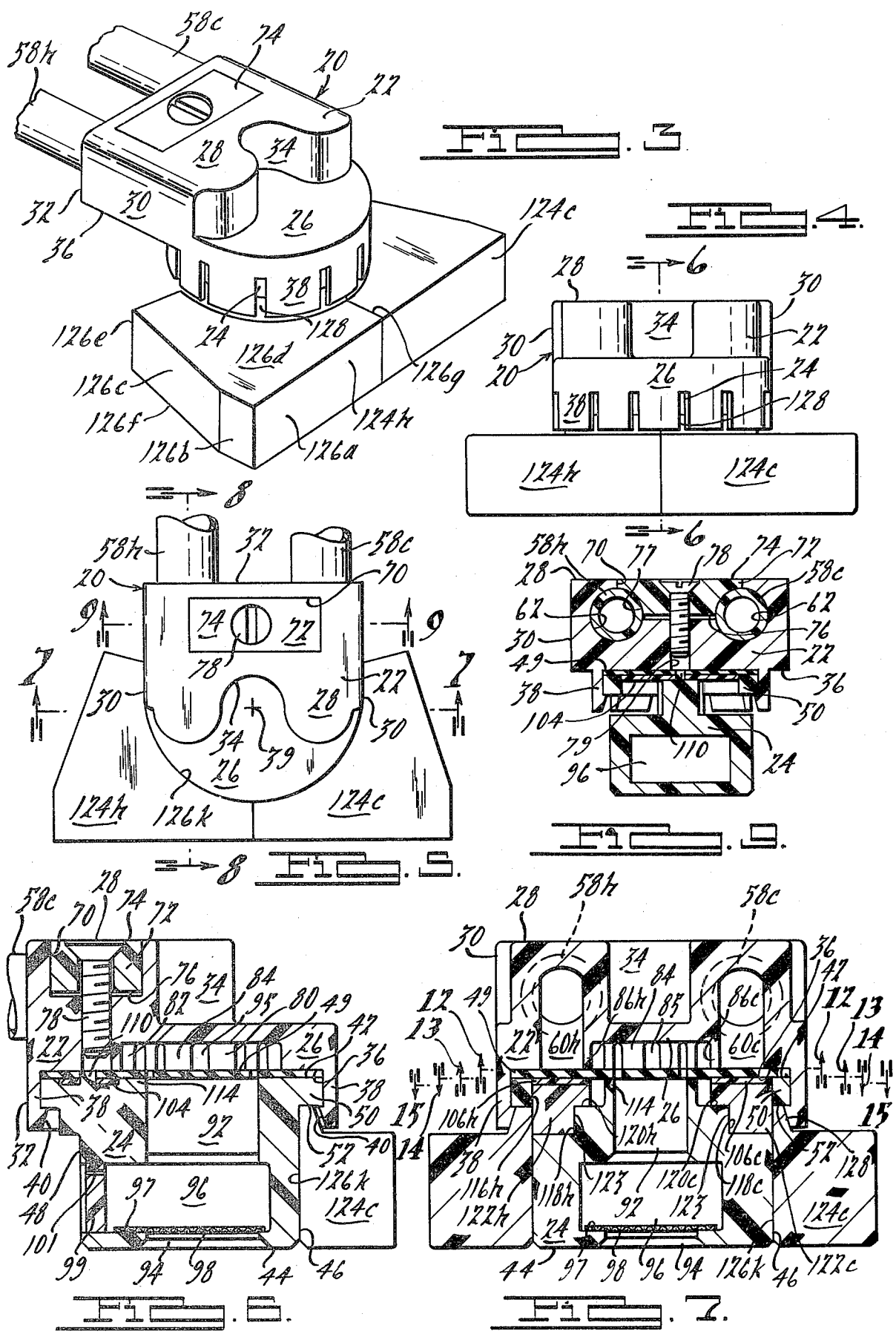

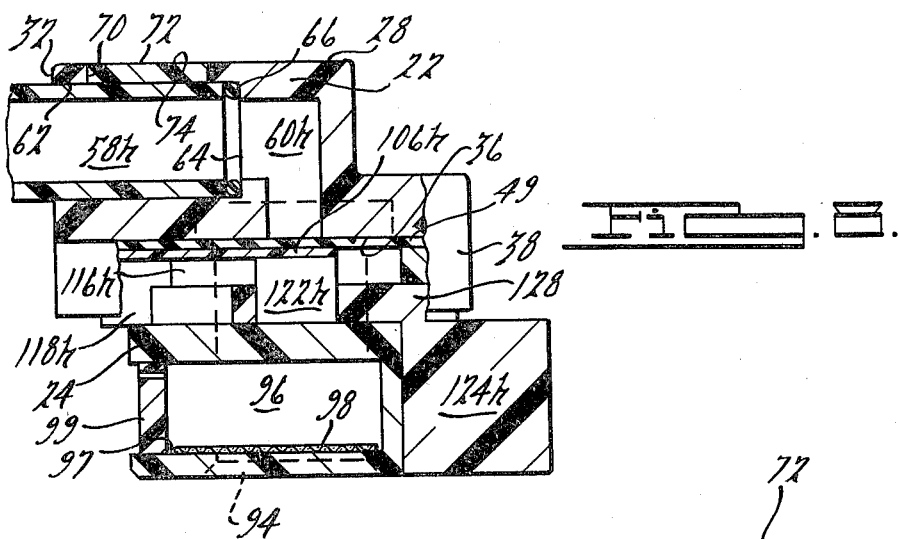
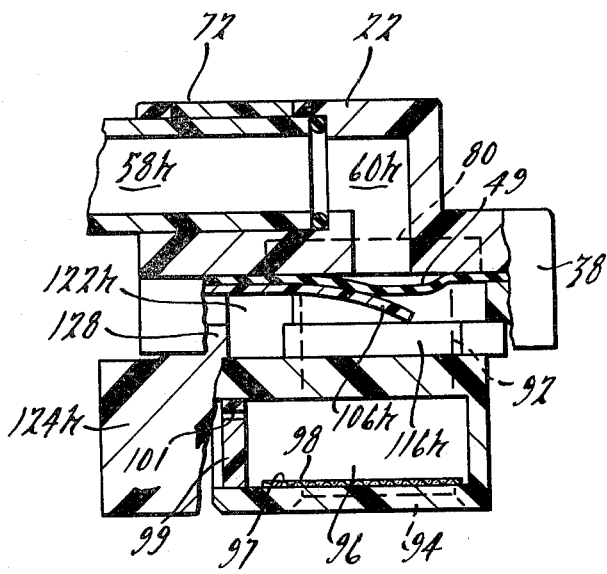
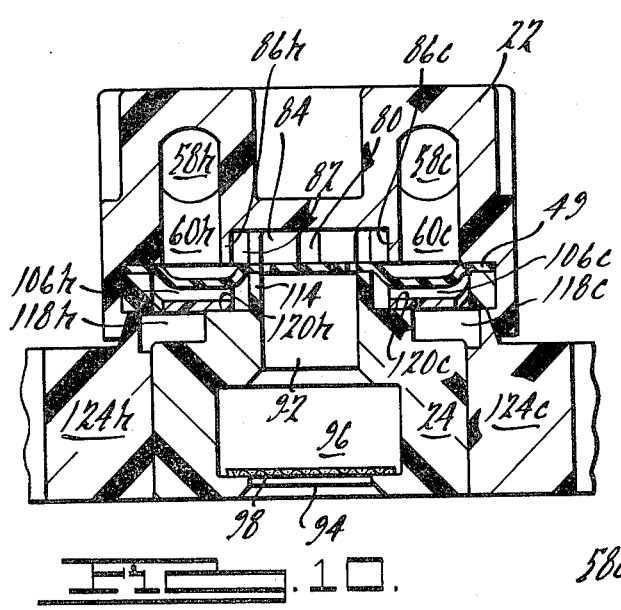
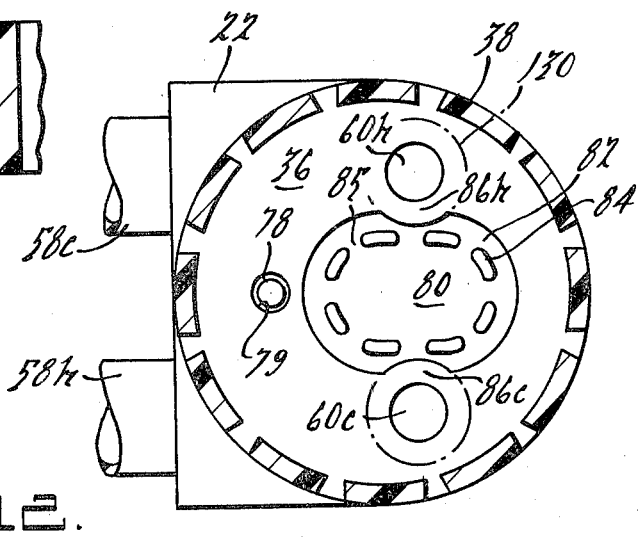

FAUCET

BACKGROUND

The present invention relates to faucets. The present invention is particularly useful for compact dual handle faucets for mixing hot and cold water in connection with a domestic water system or the like.

Many water faucets have been designed in the past. The most common configuration for water faucets involves provision of two independent valve assemblies. Each valve assembly regulates the flow of fluid from one of two fluid sources of differing tmperatures. Usually, each valve assembly is operated by a rotary handle. In this type of faucet, the outlet of each of the valve assemblies is coupled to a common mixing chamber which is connected to an outlet spout. The fluid outlet spout typically extends from the valve assembly to a position over a basin. An example of a valve for this type of faucet is described in U.S. Pat. No. 3,645,493 (issued Feb. 29, 1972).

The second most common configuration for faucets uses a single handle which controls the rate of discharge of fluid from both of the fluid sources. Such single handle faucets have a single valve assembly interposed between the fluid sources and the fluid outlet. Usually, such a valve assembly is operated by a single handle that pivots in two different planes, pivots in one plane and rotates on its base, or reciprocates and rotates on its base. This permits regulation by the single handle of the total flow rate of water and the relative flow rates of water from the two sources. Examples of this type of faucet include those disclosed in U.S. Pat. Nos. 2,966,928 (issued Jan. 3, 1961); 4,043,359 (issued Aug. 23, 1977) and 4,033,373 (issued July 5, 1977). The valve assemblies of such faucets are often too large to be positioned at the end of the spout and are thus positioned adjacent to a wall or at the back of the sink. Similar to the configuration of two handle faucets, the fluid outlet spout extends from the housing of the valve body to a position over a basin.

While each of these types of faucets has its advantages, each shares the disadvantage of being difficult or impossible to operate with dirty hands without dirtying the control handles. Furthermore, each of these faucets is difficult for small children to reach in some installations. The above-described faucets are also difficult for some handicapped people to operate.

The object of the present invention is to provide a faucet having a control handle mounted near the end of the spout. Another object of the present invention is to provide a faucet having two control handles each operable by a simple manual exertion of pressure such as a gentle nudge by the back of the hand of the user. Another object of the present invention is to provide a faucet having all valve components easily accessible for repair or replacement. Still another object of the present invention is to provide a faucet with a compact modular valve body having few and relatively inexpensive components.

SUMMARY

The present invention provides a faucet for controlling the rate of discharge of fluid from at least one supply line containing fluid under pressure. The faucet has a hollow housing having a base portion and a spout extending therefrom. A valve body is located towards the end of the spout.

In the preferred embodiment, the valve body of the faucet has a housing having a passageway therethrough with an inlet port and an outlet port. A supply line is coupled to the inlet port. A valve seat is formed intermediate the inlet port and the outlet port. A slideway is provided in the housing adjacent to the seat, one of the surfaces of the slideway being tangential to the seat. A flat cantilever spring has one of its ends secured to said housing, the other of its ends overlying the seat, and its intermediate portion disposed within the slideway. A movable element is disposed within the slideway and engages a surface of the spring. A handle is fastened to the movable element and is selectively operable to move the movable element within the slideway along the surface of the spring.

The pressure exerted by the fluid upon the end of the spring overlying the seat deflects the other end of the spring away from the seat. The movement of the movable element varies the amount of deflection of the other end of the spring away from the seat. The movable element thereby regulates the rate of passage of fluid between the spring and the seat and thus controls the rate of discharge of fluid through the outlet port.

BRIEF DESCRIPTION OF THE DRAWING

FIG. 3 is a perspective view of the valve body of the faucet of FIG. 1;

FIG. 4 is a front elevational view of the valve body of FIG. 3;

FIG. 5 is a top view of the valve body of FIG. 3;

FIG. 6 is a sectional view of the valve body taken along line 6—6 of FIG. 4;

FIGS. 7 and 8 are sectional views of the valve body taken along lines 7—7 and 8—8 respectively of FIG. 5;

FIG. 9 is a sectional view of the valve body taken along line 9—9 of FIG. 5 and shows the means for fastening the valve body to water supply lines from pressurized water sources;

FIGS. 10 and 11 are sectional views similar to FIGS. 7 and 8, respectively, but wherein both of the valves are in open positions;

FIGS. 12 and 13 are sectional views of the valve body taken along lines 12—12 and 13—13 respectively of FIG. 7 and illustrate the upper main body of the valve body;

DETAILED DESCRIPTION OF THE PREFERRED EMBODIMENT

Figure 1:
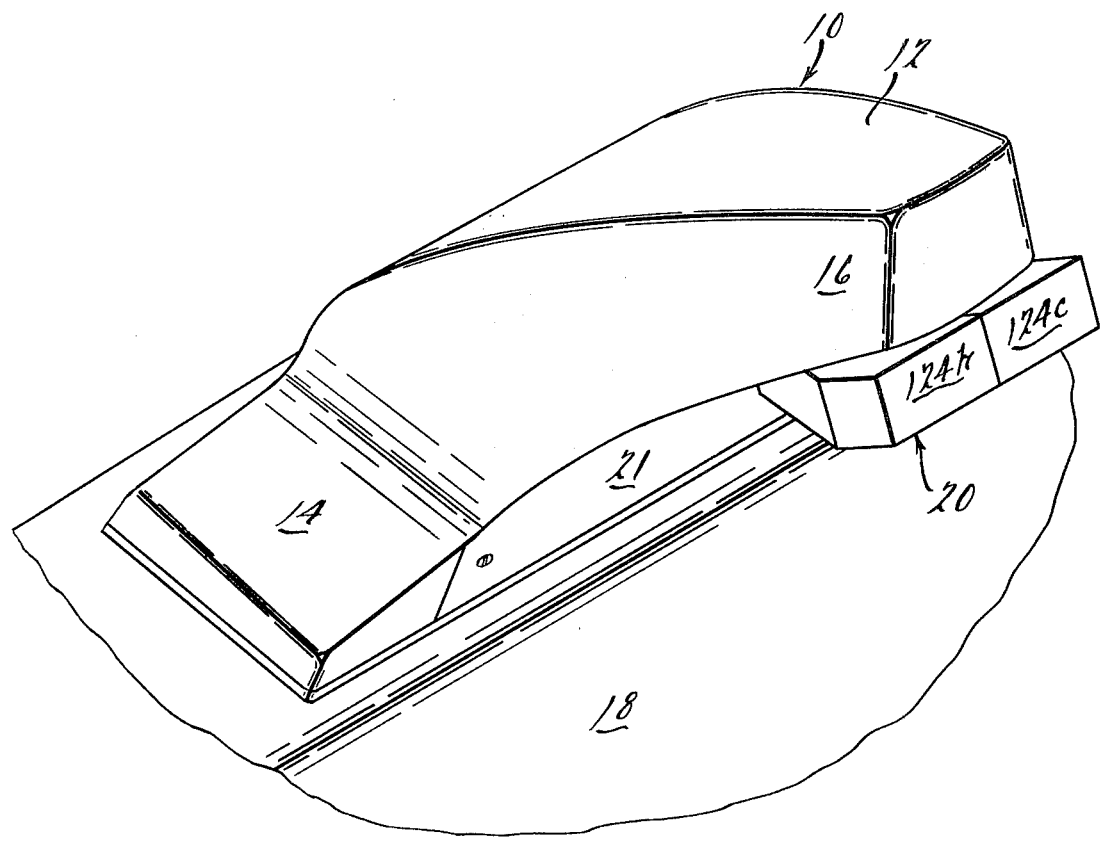
FIG. 1 is a perspective view of a faucet with two valves according to the present invention wherein both of the valves of the faucet are closed.

The present invention comprises a faucet for controlling the rate of discharge of fluid from at least one supply line containing fluid under pressure. The drawing depicts the preferred embodiment of the present invention. The many objects and advantages of the present invention will become apparent to those skilled in the art when the following detailed description is read together with the drawing.

Figure 2:
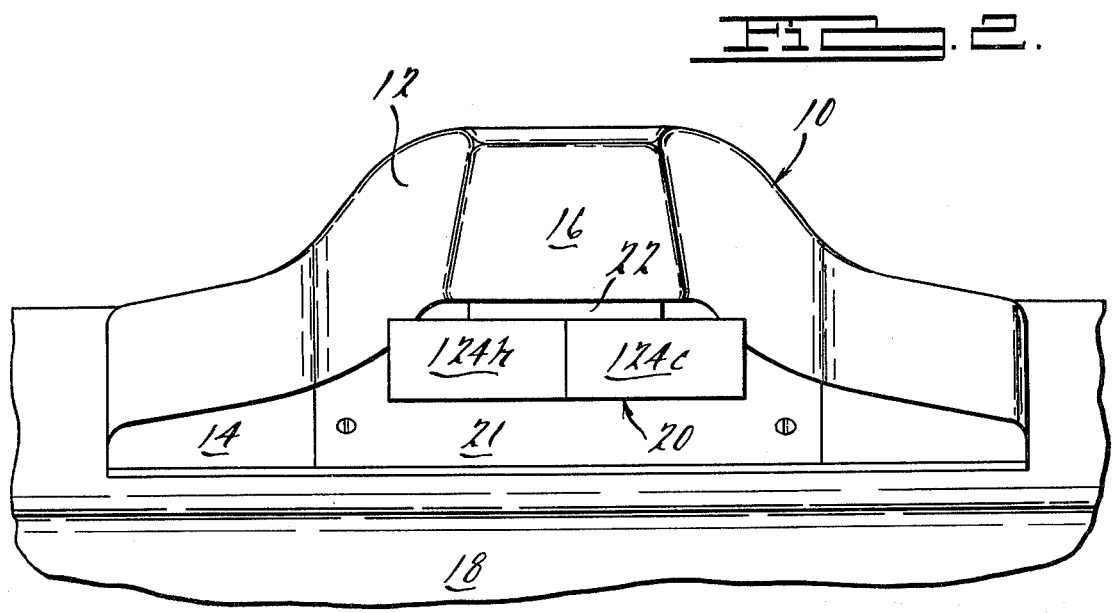
FIG. 2 is a front elevational view of the faucet of FIG. 1 taken at a plane 45° from the vertical.

FIGS. 1 and 2 illustrates a faucet 10 of the type used to mix hot and cold water under pressure and to discharge the mixed water. The faucet 10 comprises a hollow housing 12 having an escutcheon 14 and a spout 16. The escutcheon 14 is fastened to the rim of a sink 18. A faucet valve body 20 is located within the spout 16. The valve body 20 is a modular unit and is illustrated in FIGS. 3 through 17 of the drawing. A plate 21 is fastened to the lower side of the housing 12 to secure the valve body 20 to the housing 12 and to aesthetically complete the faucet 10. The specific shape and contours of the faucet 10 and the valve body 20 have only ornamental sigificance.

The valve body 20, as best illustrated in FIGS. 3, 4 and 6, has two interconnected main body units, an upper main body 22 and a lower main body 24. The lower main body 24 is coupled to the upper main body 22 in a manner that is described below. The two main bodies 22 and 24 are preferably plastic moldings or metallic castings but may be formed of any appropriate material and by any convenient means. The exterior appearance and dimensions of the valve body 20 are easily varied from that shown in the drawing.

The upper main body 22 is illustrated as a right rectangular parallelepiped having a semicircular extension 26 (FIGS. 3 through 6). In the embodiment illustrated, the rectangular portion of the upper main body 22 has a flat top surface 28, two flat side surfaces 30, a flat back surface 32 and a curved front surface 34 (FIGS. 3 and 5). The upper main body 22 further has a flat bottom surface 36 (FIGS. 3 and 6) that is common to the rectangular portion and to the extension 26. Several vertically extending teeth 38 (FIGS. 3, 4 and 6) extend downwardly from the bottom surface 36 in a circular pattern. The circular region defined by the teeth is centered on a point below the center 39 (FIG. 5) of the extension 26 and has approximately the same radial measurement as the extension 26. Each of the teeth 38 is curved about a vertical line through the center 39 of the extension 26. Each of the teeth 38 has a flange 40 (FIG. 6) extending towards the center of the circular region defined by the several teeth.

The lower main body 24 is illustrated as a generally cylindrically shaped member, as best shown in FIGS. 6 and 7. The lower main body 24 is disposed within and below the region defined by the teeth 38 of the upper main body 22. The lower main body 24 has a flat upper surface 42, a flat lower surface 44, and a cylindrical side surface 46. A portion 48 (FIG. 6) of the side surface 44 is cut away near the lower part of the back of the lower main body 24. A flat flexible diaphragm 49 is disposed between the lower surface 36 of the upper main body 22 and the upper surface 42 of the lower main body 24. The diaphragm 49, described later in greater detail, is secured in position and is sealed around its entire periphery by being squeezed between the peripheral portions of the surface 36 and 42 of the main bodies 22 and 24, respectively.

The lower main body 24 further has a circular ridge 50 extending from the upper portion of the side surface 46. A shoulder 52 is formed between the ridge 50 and the surface 46. The teeth 38 of the upper main body 22 extend below the ridge 50. The flange 40 at the lower end of each of the teeth 38 extends inwardly towards the surface 46 and abuts the shoulder 52 to secure the upper main body 22 and the lower main body 24 together. While relative rotation between the upper main body 22 and lower main body 24 is possible in the embodiment illustrated, the frictional forces between the teeth 38 and the ridge 50 inhibit such rotation. If desired, additional means may be provided to prevent relative rotation.

As is well known in the art, a pair of identical supply lines 58h and 58c (FIGS. 3, 5, 6 and 7) extend through apertures in the rim of the basin into the housing 12 of the faucet 10. One of the supply lines, line 58h, contains hot water under pressure and is connected to a hot water source. The other of the supply lines, line 58c, contains cold water under pressure and is connected to a cold water source. The supply lines 58h and 58c extend from the base portion 14 of the housing 12 and the spout 16 and are connected to the upper main body 22 in a manner described below.

A pair of identical passageways 60h (FIGS. 7 and 8) and 60c (FIG. 7) are provided in the upper main body 22 and are interconnected to the pipes 58h and 58c, respectively. As shown in FIG. 8 for the passageways 60h, each of the passageways 60h and 60c is "L"-shaped in vertical section. Each of the passageways 60h and 60c extends from a first opening in the back surface 32 of the upper main body to a second opening in the lower surface 36 of the upper main body 22. The second opening is within the circular region defined by the teeth 38. Each of the passageways 60h and 60c has an enlarged diameter portion 62 near the first opening. A shoulder 64 is formed between each of the enlarged diameter portions 62 and the remainder of the associated passageway.

Each of the supply lines 58h and 58c is inserted into one of the enlarged portions 62. Thus, there is always water under pressure in each of the passageways 60h and 60c when there is water under pressure in the supply lines 58h and 58c. A seal 66, such as a rubber "O" ring is provided between each of the lines 58h and 58c and the associated shouolder 64 to prevent leakage of water from the passageways 60h and 60c into the enlarged portions 62.

FIGS. 5, 6, 8 and 9 show how the supply lines 58h and 58c are secured to the upper main body 22. A rectangular slot 70 is provided in the top surface 28 of the upper main body 22. As shown in FIG. 9, the slot 70 is cut partly into the enlarged diameter portions 62 of both of the passageways 60h and 60c. A locking piece 72 rests within the slot 70. The locking piece 72 may be formed of the same type of material as the upper main body 22. The locking piece 72 has a flat upper surface 74 that rests flush with the top surface 28 of the upper main body 22. The locking piece 72 further has a flat bottom surface 76 (FIGS. 6 and 9) that has two arcuate cutaway portions 77 (FIG. 9) for the supply lines. A screw 78 (FIGS. 5, 6 and 9) passes through a vertical bore in the locking piece 72 and is fastened to an internally threaded bore 79 (FIG. 9) in the upper main body 22. The screw 78 secures the locking piece 72 against the supply lines 58h and 58c and thus secures the lines to the upper main body 22.

The bottom surface 36 of the upper main body 22 is illustrated in FIG. 12. A mixing chamber 80 is provided near the center of the circular region defined by the teeth 38 and between the openings of the passageways 60h and 60c. The mixing chamber 80 is a shallow, oval-shaped cavity. An intermediate chamber 82 is provided around the periphery of the mixing chamber 80. An oval-shaped wall 84 separates the mixing chamber 80 from the intermediate chamber 82. The wall 84 is also known in FIGS. 6 and 7. The wall 84 has a plurality of apertures 85 so that the two chambers are in fluid communication at all times. As shown in FIGS. 7 and 12, a thin wall 86c separates the intermediate chamber 82 from the passageway 60c. Similarly, as shown in FIG. 12, a thin wall 86h separates the intermediate chamber 82 from the passageway 60h.

Figure 13:
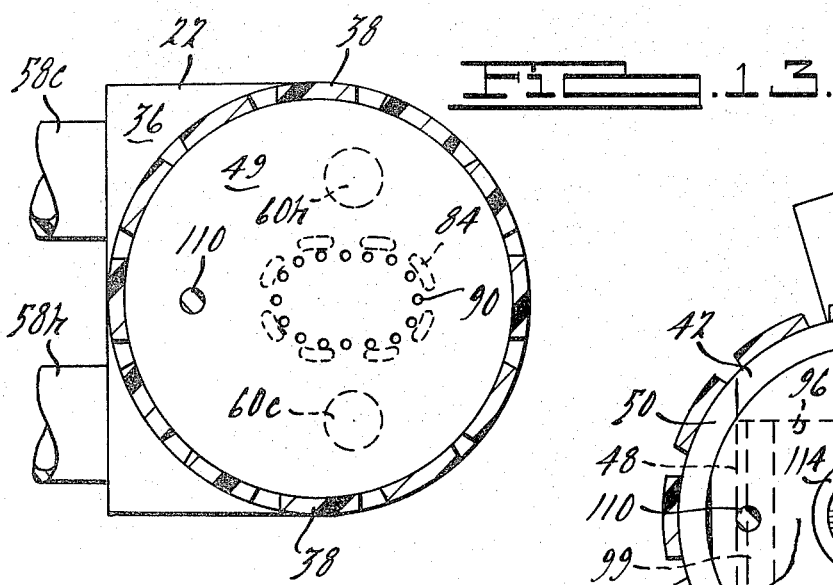

FIG. 13 is a sectional view of the valve body 20 similar to the sectional view depicted in FIG. 12 but taken at a slightly lower horizontal plane so as to show the diaphragm 49 that was referred to earlier. The diaphragm 49 is a thin, flat and circular sheet of elastomeric material such as rubber. The diaphragm 49 has a plurality of apertures 90 disposed below the mixing chamber 80, described above.

Figure 14:
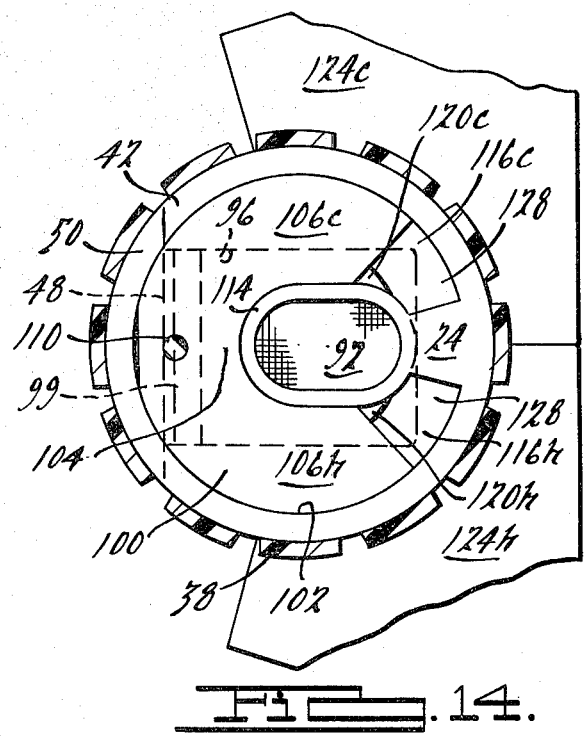
FIGS. 14 and 15 are sectional views of the valve body taken along lines 14—14 and 15—15 respectively of FIG. 7 and illustrate the lower main body of the valve body.

FIG. 14 is a sectional view of the valve body 20 taken along the same plane as the sectional view depicted in FIG. 13 but looking down on the upper surface 42 of the lower main body 24. An aperture 92 is provided in the upper surface 42. The aperture 92 is disposed below the apertures 90 (FIG. 13) in the diaphragm 49 when the two main body units are assembled. The aperture 92 is therefore always in fluid communication with the mixing chamber 80 and the intermediate chamber 82. The aperture 92, as shown in FIGS. 6 and 7, is a vertical bore having an oval cross section and extending entirely through the lower main body 24. The lower end of the aperture 92 is provided with an enlarged opening 94.

A second aperture 96 (FIGS. 6, 7, and 8) is provided partly through the lower main body 24 starting from the cutaway portion 48. The aperture 96 extends horizontally and only partly through the main body 24 and is cut transversely through the aperture 92. A metallic latticework screen 98 is provided in the aperture 96 and rests on a shoulder 97 formed between the aperture 96 and the aperture 92. A block 99 (FIGS. 6, 8 and 14) is fitted into the opening of the aperture 96 to inhibit the flow of water therethrough. The block 99 has an aperture 101 (FIGS. 6 and 8).

Also shown in FIG. 14 is a flat cantilever spring 100. The spring 100 is flexible but is made of a stiffer material than the diaphragm 49 (FIG. 13). Preferably, the spring 100 is made of a plastic having a low coefficient of friction. The spring 100 is disposed within a recess 102 in the surface 42, the recess 102 being described in greater detail shortly. The top surface of the spring 100 is flat and rests subjacent to the diaphragm 49. In an unstressed condition, as shown in FIGS. 7 and 8, the top surface of the spring 100 is flush with the bottom surface of the diaphragm 49. The spring 100 is C-shaped and has a central portion 104 and two arms 106h and 106c. The end of the arm 106h is disposed under the opening to the passageway 60h. Similarly, the end of the arm 106c is disposed under the opening to the passageway 60c.

Figure 15:
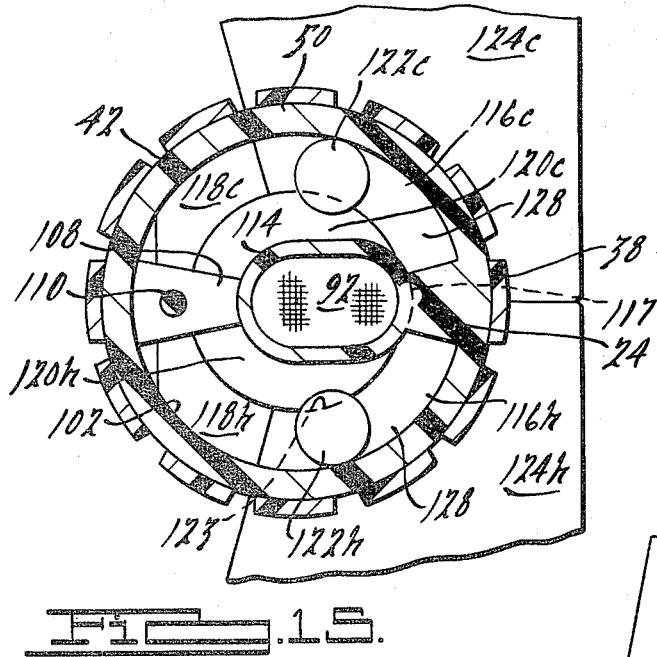
Figure 16:
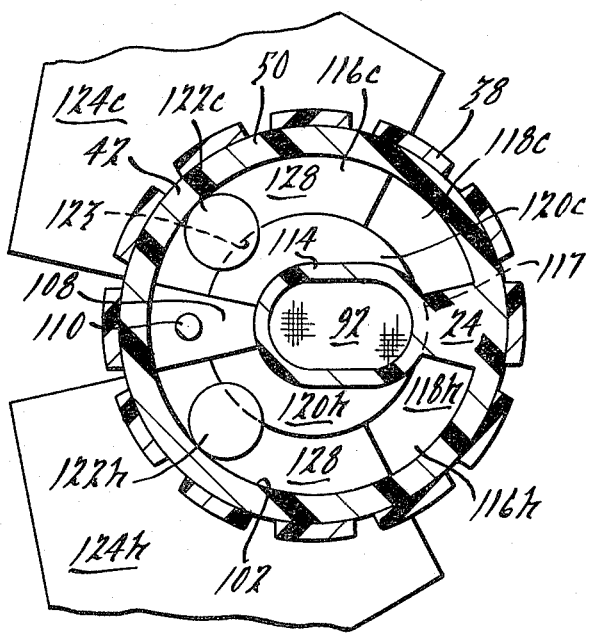
FIGS. 16 and 17 are views similar to FIGS. 15 and 4 respectively but wherein both of the valves are in open positions.

FIGS. 15 and 16 are sectional views of the valve body 20 similar to the sectional view depicted in FIG. 14 but taken at a slightly lower horizontal plane. As shown in these figures, the recess 102 is a complex region and is symetrical about a vertical plane through the center of the top surface 42 and between the passageways 60h and 60c. The recess 102 has a flat shoulder 108 underneath the center 104 of the spring 100. A post 110 extends upwardly from the shoulder 108 through apertures in the spring 100 and the diaphragm 49 to align the spring and the diaphragm (see also FIGS. 6 and 8). The post 110 extends upwardly into the bore 79 to align the lower main body 24 with the upper main body 22. A thin wall 114 is provided between the recess 102 and the aperture 92. The wall 114 is disposed below the apertured wall 84 (FIG. 13). The wall 114 cooperates with the apertured wall 84 and the diaphragm 49 to form a seal against any leakage of water from the aperture 92 to the recess 102, as shown in FIGS. 6 and 7.

The recess 102 further has two similar arcuate portions 116h and 116c each disposed on one side of the aperture 92. The arcuate portions 116h and 116c are identical to each other except that they are the mirror image of each other. Each of the arcuate portions 116h and 116c is disposed under one of the arms 106h and 106c of the spring 100. Thus, each of the arms 106h and 106c acts as a cantilever spring which is effectively fastened at one of its ends to the faucet by being trapped (together with the diaphragm 49) between the shoulder 108 and the lower surface 36 (FIG. 13) of the upper main body 22.

Figure 17:
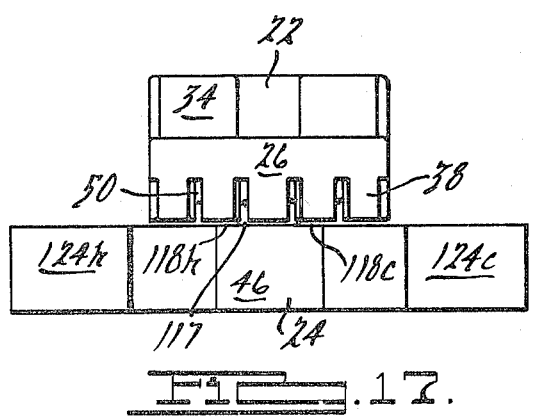

A horizontal slot 117, shown in FIGS. 15 through 17, is provided in the cylindrical sidewall 46 (FIG. 17) of the lower main body 24 and is disposed just below the cylindrical lip 50. The slot 117 is cut a constant distance into the sidewall 46 around its entire periphery except that portion of the sidewall that is near the shoulder 108 that supports the spring 100 (FIG. 16). The slot 117 has a portion 118h that is cut partly into the portion 116h of the recess 102 from below, as shown in FIGS. 7, 10, 14, 15 and 16. A shoulder 120h is formed between the portion 118h of the slot 117 and the arcuate portion 116h of the recess 102. Similarly, there is a second portion 118c of the slot 117 that is cut partly into the portion 116c of the recess 102. A shoulder 102c is formed between the portion 116c and the portion 118c.

A pair of identical sliding members 122h and 122c are provided, as illustrated in FIGS. 7, 15 and 16. One of the sliding members, sliding member 122h, is illustrated in FIGS. 8 and 9. Each of the sliding members 122h and 122c is a small cylindrical element with a portion 123 cut away. As shown in FIGS. 7 and 8 the sliding member 122h is partly disposed within the arcuate portion 116h of the recess 102. The upper surface of the sliding member 122h rests against and slides along a surface of the arm 106h of the spring 100. The upper surfaces of the cutaway portion 123 of the member 122h rest on the shoulder 120h. The lower portion of the sliding member 122h is disposed within the slot 118h. Similarly, the sliding member 122c is partly disposed without the recess 116c and partly within the slot 118. The upper surface of the sliding member 122c slides along a surface of the arm 106c of the spring 100.

A pair of handles 124h and 124c are provided, each being fastened, in a manner described below, to one of the sliding members 122h and 122c. As best seen in FIGS. 3 through 5, the handles 124h and 124c are in all ways identical to each other except that each is the mirror image of the other. Each handle is shown having seven flat faces 126a through 126g (illustrated in FIG. 3 for the handle 124h). The words "Hot" and "Cold" or other appropriate designations may be etched into the surfaces 126a or 126d of the handles 124h and 124c. Each handle also has a concave cylindrical surface 126h (FIGS. 5 through 7) adjacent to the cylindrical surface 46 of the lower main body 24. Each handle has a portion 128 extending from the cylindrical surface 126k into the slot 117 (FIGS. 3, 4, 7, 8, 14 and 15). The sliding member 122h is fastened to the portion 128 of the handle by being fitted into an aperture (not illustrated) in portion 128.

The arcuate portions 116h of the recess 102 form slideways for the sliding members 122h and 122c, respectively. The sliding members 122h and 122c may be moved along the slideways by manipulation of the handles 124h and 124c, respectively. Each of the handles is constrained by a curved surface 126k (FIG. 7) by the sliding member 122h or 122c and by the associated arcuate portions 116h or 116c to slide about the surface 46 of the lower main body 24.

The valve body of the present invention is operated by selective manipulation of the handles. FIGS. 3 through 8 and FIGS. 14 and 15 illustrate the valve body 20 with both handles 124h and 124c in the fully closed position. FIGS. 10, 11, 16 and 17 illustrate the valve body 20 with both handles in the fully opened position. Since the handles operate identically, the operation of only one of the handles is described below.

When the hot water handle 124h is in the fully closed position (FIGS. 7 and 8) the sliding member 122h is disposed directly below the opening in the passageway 60h. A portion 130 (FIG. 12) of the surface 36 that surrounds the opening of the passageway 60h acts as a seat for a portion of the diaphragm 49 and for the end of the arm 106h of the spring 100. The sliding member 122h presses upwardly against the end of the arm 106h of the flat spring 100. The spring 100 presses upwardly against the diaphragm 49 to seal the opening of the passageway 60h closed. Thus, the pressurized fluid contained in the passageway 60h is not permitted to leave the passageway 60h.

When the hot water handle 124h is an opened position (FIGS. 10 and 11) the sliding member 122h is disposed along the arcuate portion 116h of the recess 102 in a position between the center portion 104 of the spring 100 and the opening in the passageway 60h. As in the closed position, the sliding member 122h presses upwardly against the arm 106h of the spring 100. The pressurized hot water in the passageway 60h exerts a downward force on the end of the spring, causing it to deflect, as shown in FIGS. 10 and 11. The deflection of the spring 100 and the diaphragm 49 allows the hot water to flow from the passageway 60h past the wall 86h and into the intermediate chamber 82 of the mixing chamber 80, as best shown in FIG. 10. As shown in FIGS. 10 and 12, the hot water flows into the mixing chamber 80 through the apertures 90 in the diaphragm 49 (FIG. 13), into the outlet aperture 92 and finally out the opening 94. As previously mentioned, the apertured wall 84 in the mixing chamber cooperates with the wall 114 to prevent leakage of fluid from the aperture 92 into the recess 102.

The multiple apertures 90 in the diaphragm 49 and the apertures in the latticework screen 98 create a turbulent flow of water through the outlet aperture 92 and into the sink 18. The aperture 101 on the block 99 allows air to enter into the outlet aperture 92 and become mixed with the water therein.

The handle 124h can be used to continuously vary the amount of hot water flowing into the mixing chamber 80. As the handle 124h is progressively moved from the position illustrated in FIGS. 7 and 8 towards the position illustrated in FIGS. 10 and 11, the sliding member 122h moves further from the passageway 60h. As the sliding member 122h is progressively moved away from the passageway 60h, the amount of deflection of the end of the arm 106h of the spring 100 increases. As the amount of deflection increases, the flow rate of fluid into the mixing chamber 80 increases.

The spring 100 and the diaphragm 49 could be comprised of the same material and could even be made together as one component. In the preferred embodiment, however, this is not the case. The diaphragm 49 is preferably made from a very flexible material such as rubber. The spring 100 is preferably made of a slightly stiffer material and preferably has a low coefficient of friction on the surface that is in contact with the sliding members 122h and 122c. An example of a good material for the spring 100 is the synthetic resin polymer currently available under the trademark TELFLON.

The use of a rubber diaphragm 49 offers two major advantages. By using a very flexible material, a better seal is formed between the apertured wall 84 and the wall 114 and between the top surface 42 of the lower main body 24 and the lower surface 36 of the upper main body 22. Furthermore, the apertures 90 in the diaphragm 49 are self-cleaning. When material accumulates in the apertures 90, the pressure on the upper surface of the diaphragm increases and causes the diaphragm 49 to flex downwardly and to stretch. As the diaphragm 49 stretches, the apertures 90 change shape. The combined effect of the turbulent flow of water and the stretching of the rubber permits the water to wash the material through the apertures 90.

The use of a spring 100 as an intermediate member between the sliding members 122h and 122c and the diaphragm 49 offers several advantages. The sliding members 122h and 122c will move more easily against the surface of the spring 100 than they would move against the surface of the rubber diaphragm 49. Additionally, the spring 100 acts as a multiplier, increasing the amount of travel of each of the handles 124h and 124c between the fully closed and the fully opened positions.

From the above description, it can be readily seen that the present invention provides a valve body which has handles that are easily reached and operated since the valve body is disposed very close to the open end of the spout. The faucet is particularly easy to operate by users with certain types of handicaps or by users who do not wish to touch the handles of the faucet with dirty hands since the control handles are each operable by a simple manual exertion of pressure, such as a gentle nudge by the back of the hand of the user. Alternatively, both of the handles of the faucet may be simultaneously operated by one hand of the user by use of two fingers due to the configuration of the handles. Furthermore, the faucet is easy to repair since all components of the valve body are located within a small module at the end of the spout.

While the present invention has particular utility in connection with domestic and public water systems and is shown and described above in connection with such a system, its utility is not limited to water faucets. Further variations and modifications from the above may be apparent to one skilled in the art and are included within the scope of the appended claims.

Having thus described the present invention by means of a detailed description of the best mode contemplated at the time of filing for carrying out the present invention, what is claimed as novel is as follows:

1. A faucet comprising a housing, a passageway passing through said housing and having an inlet and an outlet, a seat formed intermediate said inlet and said outlet, a slideway cavity in said housing adjacent to said seat, a flat cantilever spring secured at one of its ends to said housing and disposed at the other of its ends in said slideway cavity, a first surface of a portion of said spring overlying said seat, a flexible valve member secured in said housing between said portion of said spring and said seat, a movable element disposed in said slideway cavity and engaging a second surface of said portion of said spring remote from said valve member, and selectively operable control means fastened to said element and selectively operable to move said element within said slideway cavity along said second surface of said spring; whereby movement of said movable element along said spring urges said other end of said spring against said valve member and towards said seat to thereby regulate the rate of discharge of fluid from said inlet to said outlet by varying the amount of deflection of said spring and the distance between said valve member and said seat.

2. The faucet of claim 1 wherein said housing comprises a first housing element having said inlet and said seat and a second housing element fastened to said first housing element and having said slideway and said outlet, and wherein said spring is disposed between said two housing elements and is fastened to said housing by being held between adjacent surfaces of said two housings.

3. The faucet of claim 2, wherein said valve member comprises a diaphragm, said diaphragm having a portion overlying said outlet and has apertures through said portion, said first housing element has a cavity overlying said apertures and a wall separating said inlet from said cavity, said diaphragm being sealed against leakage around its entire periphery by being held between surfaces of said housing elements.

4. The faucet of claim 3 wherein said first housing element further comprises a wall dividing said cavity into two chambers, said wall being apertured for fluid flow therethrough, one of said chambers overlying said apertures in said diaphragm and the other of said chambers being intermediate said one chamber and said seat; and wherein said second housing element further comprises a wall separating said outlet from said slide-way cavity, said wall cooperating with said apertured wall to form a seal leakage of fluid from said outlet to said slideway cavity.

* * * * *